United States Patent [19]

Ohmae et al.

[11] Patent Number: 4,957,660
[45] Date of Patent: Sep. 18, 1990

[54] ELECTRICALLY CONDUCTIVE PLASTIC MOLDINGS AND PROCESS FOR PRODUCING THE SAME

[75] Inventors: Tadayuki Ohmae; Tadashi Sakurai; Noboru Yamaguchi; Mitsuyuki Okada; Kouichiro Asao, all of Chiba, Japan

[73] Assignee: Sumitomo Chemical Company, Limited, Osaka, Japan

[21] Appl. No.: 188,781

[22] Filed: Apr. 29, 1988

[30] Foreign Application Priority Data

Apr. 30, 1987 [JP] Japan ................................. 62-109508

[51] Int. Cl.⁵ .............................................. H01B 1/00
[52] U.S. Cl. ..................................... 252/500; 252/518; 252/519; 523/137; 264/331.15; 264/331.18; 264/331.16; 264/328.18; 524/284; 524/401; 524/80; 524/422; 524/417; 524/429; 524/435; 524/157; 524/158
[58] Field of Search ....................... 252/500, 518, 519; 523/137; 524/401, 80, 422, 417, 429, 435, 157, 158, 284, 287; 264/328.18, 330, 331.11, 331.15, 331.18, 331.16

[56] References Cited

PUBLICATIONS

European Search Report EP 88 30 3814.

Primary Examiner—Josephine Barr
Attorney, Agent, or Firm—Sughrue, Mion, Zinn, Macpeak & Seas

[57] ABSTRACT

A conductive plastic molding obtained by melt molding an ethylene copolymer comprising from 40 to 90% by weight of an ethylene unit, from 10 to 60% by weight of at least one dialkylaminoalkylacrylamide comonomer unit represented by formula

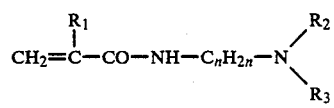

wherein $R_1$ represents a hydrogen atom or a methyl group; $R_2$ and $R_3$ each represents an alkyl group having from 1 to 4 carbon atoms; and n represents an integer of from 2 to 5, and up to 20% by weight of one or more ethylenically unsaturated comonomer units and having a number average molecular weight of from 5,000 to 50,000 and impregnating at least 10 parts by weight of an aqueous solution of at least one of an organic acid, an inorganic acid, and an inorganic metal salt into 100 parts by weight of the resulting melt molded. The molding exhibits excellent conductivity and can be obtained easily and at low cost without any limitation on shape.

9 Claims, No Drawings

ELECTRICALLY CONDUCTIVE PLASTIC MOLDINGS AND PROCESS FOR PRODUCING THE SAME

FIELD OF THE INVENTION

This invention relates to an electrically conductive plastic molding using an ethylene copolymer and a process for producing the same. More particularly, it relates to an ionically conductive plastic molding comprising a molding of an ethylene-dialkylaminoalkylacrylamide copolymer having impregnated therein an aqueous solution of at least one of inorganic acids, organic acids, and inorganic metal salts, and to a process for producing the same.

The electrically conductive plastic moldings of this invention can be obtained easily and exhibit excellent conductivity. They are useful as electromagnetic wave shields, antistatic materials, electrically heating elements for plane heater, etc. They can also be applied, for example, to fixation of an electrolyte liquor of a portable lead accumulator by taking advantage of their ionic conductivity.

BACKGROUND OF THE INVENTION

Conductive plastic moldings obtained by imparting electrical conductivity to plastic moldings have advantages of moldability, light weight, and the like and have recently been utilized in a broad range of application, such as electromagnetic wave shields, antistatic materials, plane heaters for room heating, etc. The application range tends to be further broadened.

Known techniques for imparting conductivity to plastic moldings include compounding of a conductive substance, e.g., carbon black, metal powders, metallic fibers, etc. into a resin molding material, application of a coating containing a conductive substance to a resin molding, adhesion of a metal atom to a resin molding by ion-plating or sputtering, and the like. In addition, various attempts have been made to render the resin per se electrically conductive.

However, these conventional techniques have their respective disadvantages as described below, and the resulting products are not always satisfactory depending on use.

According to the method of dispersing a conductive substance in a resin before molding to obtain a conductive resin molding material, achievement of satisfactory conductivity requires a large quantity of the conductive substance to be compounded, which leads to adverse influences on molding properties of the resulting mixture and physical properties of the resin.

The method comprising applying a coating having incorporated therein a conductive substance onto a resin molding encounters difficulty in uniformly applying the coating particularly on a molding of complicated shape. Besides, the conductive layer formed on the surface of the molding is apt to fall off during long-term use.

The method comprising adhesion of a metal atom to the surface of a resin molding requires a special apparatus to carry out to thereby increase the cost.

Further, none of the so-far proposed resins showing conductivity by themselves have been put into practical use due to their poor molding properties.

On the other hand, in the filed of portable storage batteries including lead accumulators which are utilized as auto batteries, there are many problems in handling and transportation because a fluid, such as dilute sulfuric acid, is employed as an electrolyte liquor.

In order to solve these problems, various attempts have been made to fix the electrolyte liquor. For example, there have been proposed a method of impregnating an electrolyte liquor into voids of glass cloth and a method of incorporating a gelling agent to an electrolyte liquor. These proposals, however, are still unsatisfactory as fixation or retention of the electrolyte liquor is insufficient and also the cell to be used is limited in shape and volume. Therefore, it has been keenly demanded to develop an effective method for fixation of an electrolyte liquor for portable storage batteries.

SUMMARY OF THE INVENTION

One object of this invention is to eliminate various problems associated with the state-of-the-art conductive plastic moldings and to provide a ionically conductive plastic molding having excellent conductivity which can be obtained by molding with ease and can be fabricated into a complicated shape.

Another object of this invention is to provide a process for producing the above-described conductive plastic molding easily and at low cost.

In the light of the above objects, the inventors have conducted intensive and extensive researches on molding resins having excellent molding properties as well as excellent receptivity to an organic or inorganic acid aqueous solution, an inorganic metal salt aqueous solution or a mixture thereof upon contact therewith to provide a conductive molding. As a result, it has now been found that a copolymer comprising ethylene and a dialkylaminoalkylacrylamide comonomer effectively meets the purposes.

The present invention relates to a conductive plastic molding which is obtained by melt molding an ethylene copolymer comprising from 40 to 90% by weight of an ethylene unit, from 10 to 60% by weight of at least one dialkylaminoalkylacrylamide comonomer unit represented by formula (I):

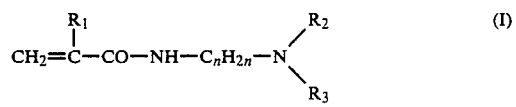

wherein $R_1$ represents a hydrogen atom or a methyl group; $R_2$ and $R_3$ each represents an alkyl group haVing from 1 to 4 carbon atoms; and n represents an integer of from 2 to 5, and up to 20% by weight of one or more ethylenically unsaturated comonomer units, and having a number average molecular weight of from 5,000 to 50,000 and impregnating at least 10 parts by weight of an aqueous solution of at least one of an organic acid, an inorganic acid, and an inorganic metal salt into 100 parts by weight of the resulting melt molded.

The present invention further relates to a process for producing the above-described conductive plastic molding.

DETAILED DESCRIPTION OF THE INVENTION

The ethylene copolymer which can be used as a molding resin in the present invention may be prepared by any process, but is generally prepared by a high-pressure polymerization process, in which ethylene and a dialkylaminoalkylacrylamide are copolymerized in the presence of a radical polymerization initiator at a temperature of from 100° to 300° C. under a pressure of from 500 to 3,000 kg/cm². The polymerization may be carried out in a batch system, a semi-continuous system, or a continuous system. The continuous system is industrially advantageous.

Specific examples of the dialkylaminoalkylacrylamide comonomer are dimethylaminoethylacrylamide, dimethylaminopropylacrylamide, dimethylaminobutylacrylamide, diethylaminoethylacrylamide, diethylaminopropylacrylamide, diethylaminobutylacrylamide, dipropylaminoethylacrylamide, dipropylaminopropylacrylamide, dipropylaminobutylacrylamide, N-(1,1-dimethyl-3-dimethylaminopropyl)acrylamide, N-(2-methyl-3-dimethylaminopropyl)acrylamide, etc. and methacrylamide derivatives corresponding to these acrylamides. Of these preferred are dimethylaminopropylacrylamide, dimethylaminopropylmethacrylamide, dimethylaminoethylacrylamide, and dimethylaminoethylmethacrylamide.

The content of the dialkylaminoalkylacrylamide comonomer unit in the ethylene copolymer ranges from 10 to 60%, and preferably from 10 to 50%, by weight. If it is less than 10% by weight, the resulting molding cannot be sufficiently impregnated with an aqueous solution of an organic acid and/or an inorganic acid, and/or an inorganic metal salt, thus failing to manifest excellent conductivity.

On the other hand, if the content of the dialkylaminoalkylacrylamide comonomer unit exceeds 60% by weight, the ethylene copolymer has so high hydrophilic properties that the resulting molding may have reduced mechanical strength when immersed in the aqueous solution of an organic acid and/or an inorganic acid, and/or an inorganic metal salt and, in some cases, ultimately dissolved in the aqueous solution.

Specific and preferred examples of other ethylenically unsaturated comonomer which may be used in this invention include methyl acrylate, methyl methacrylate, ethyl acrylate, ethyl methacrylate, n-butyl acrylate, n-butyl methacrylate, glycidyl acrylate, glycidyl methacrylate, vinyl acetate, vinyl propionate, dimethylaminoethyl methacrylate, dimethylaminoethyl acrylate, etc. Particularly preferred of them are methyl acrylate, methyl methacrylate, ethyl acrylate, vinyl acetate, dimethylaminoethyl methacrylate, and dimethylaminoethyl acrylate.

The content of the ethylenically unsaturated comonomer unit in the ethylene copolymer should not exceed 20% by weight, and preferably not exceed 15% by weight.

The ethylene copolymer of this invention has a number average molecular weight of from 5,000 to 50,000 ($[\eta]$=0.29–1.23), and preferably from 8,000 to 40,000 ($[\eta]$=0.39–1.07) as calculated from the intrinsic viscosity $[\eta]$ measured at 135° C. in a tetralin solution according to the following equation:

$$[\eta] = 1.35 \times 10^{-3} \overline{M}_n^{0.63}$$

wherein $[\eta]$ is an intrinsic viscosity; and $\overline{M}$ is a number average molecular weight [cf. I. Harris, *Journal of Polymer Science*, Vol. 8 (4), 353–364 (1952)].

If the $\overline{M}$ of the ethylene copolymer exceeds 50,000, the molding cannot be sufficiently impregnated with the aqueous solution of an inorganic acid and/or an organic acid, and/or an inorganic metal salt, failing to attain excellent conductivity. If it is less than 5,000, the resulting molding suffers from not only shortage of mechanical strength but also lack of shape retention when impregnated with the aqueous solution.

The terminology "plastic molding" or "resin molding" as used herein means molded products obtained by molding the above-described ethylene copolymer by commonly employed molding processes, such as extrusion molding, injection molding, blow molding, vacuum molding, and the like, in which are included tubing, sheeting, filming, and spinning. The form of the molding is not particularly limited and includes, for example, films, sheets, tubes, rods, fibers (inclusive of hollow fibers), nonwoven fabric, woven fabric, etc. The fibers may be conjugate fibers with other resins, e.g., polypropylene, polyester, polyamide, polyethylene, etc., and the nonwoven and woven fabric may be those obtained from such conjugate fibers.

Further, the resin molding according to the present invention embraces composites or laminates composed of the above-recited moldings and other materials, such as metals (e.g., stainless steel, lead, etc.), other resins or rubbers (e.g., polyethylene, polypropylene, ethylene-propylene rubber, etc.), glass, and the like.

In the present invention, the resin molding can be rendered electrically conductive by contacting it with an impregnating aqueous solution containing at least one of inorganic acids, organic acids, and inorganic metal salts by immersion or the like impregnation technique.

The inorganic acids to be used include, for example, hydrochloric acid, sulfuric acid, nitric acid, phosphoric acid, pyrophosphoric acid, polyphosphoric acid, perchloric acid, hydrofluoric acid, hydrobromic acid, and hydroiodic acid.

The organic acids include carboxylic acids, e.g., formic acid, acetic acid, oxalic acid, tartaric acid, benzoic acid, lactic acid, acrylic acid, maleic acid, etc., and sulfonic acids, e.g., methanesulfonic acid, benzenesulfonic acid, etc.

The inorganic metal salts to be used are selected from those easily soluble in water or an acidic aqueous solution and include ferrous chloride, ferric chloride, nickel chloride, ferrous sulfate, ferric sulfate, nickel sulfate, ferrous nitrate, ferric nitrate, nickel nitrate, etc.

The concentration of the inorganic metal salt in the aqueous solution is arbitrary so long as within its solubility in water or an inorganic acid aqueous solution. The concentration of the inorganic acid may be either low as in a 0.01N sulfuric acid or high as in a 70% by weight sulfuric acid. The concentration of the organic acid aqueous solution may be optionally chosen within the range of solubility of the organic acid.

The upper limit of the amount of the abovedescribed aqueous solution to be impregnated in the molding is necessarily determined by the content of the dialkylaminoalkylacrylamide comonomer unit in the ethylene copolymer and the molecular weight of the copolymer, while the lower limit is 10 parts by weight per 100 parts by weight of the molding. If the impregnated amount is less than 10 parts, sufficient conductivity cannot be attained.

The temperature and time for the contact between the molding and the impregnating aqueous solution, for example, immersion, can be selected according to the desired conductivity, the desired pick-up of the impregnating liquor, and the shape of the molding. For instance, treatment for a molding having a relatively large surface area, such as films, fibers, nonwoven fabric, woven fabric, etc., can be completed at a relatively low temperature for a short period of time, e.g., at 25° C. for 1 hour or less. With a molding having a relatively small surface area, such as thick sheets, tubes, rods, etc., the contact temperature may be raised, e.g., to 60° C., to complete the treatment in a short period of time, e.g., 1 hour or less.

The plastic molding prepared from the ethylene copolymer of the present invention which can be applied to the treatment for rendering electrically conductive according to the present invention is not limited in shape and has excellent receptivity to the above-described aqueous solution upon contact therewith to provide a plastic molding exhibiting superior electrical conductivity. In addition, the conductive plastic molding of the present invention is flame retardant and self-extinguishing. It is possible to dye the conductive plastic molding in an arbitrary color with an acid dye or a metallized acid dye.

As described above, the conductive plastic molding according to the present invention enjoys many advantages over those obtained by conventional techniques and, therefore, can be used in a wider range of application such as electromagnetic wave shields, antistatic materials, electrically heating elements for plane heater, and for fixation of an electrolyte liquor of a portable lead accumulator.

The present invention is now illustrated in greater detail with reference to Examples and Comparative Examples, but it should be understood that the present invention is not deemed to be limited thereto. In these examples all the percents are by weight unless otherwise indicated.

EXAMPLE 1

An ethylene copolymer containing 57% of an ethylene unit and 43% of a dimethylaminopropylacrylamide unit and having a number average molecular weight of 1,000 ($[\eta]=0.91$) and a melt index of 5 g/10 min as measured by a melt indexer at 125° C. was extrusion molded in a T-die extruder having a diameter of 20 mm at a resin temperature of 155° C. to prepare a continuous sheeting of 7.3 cm in width and 2.1 mm in thickness. A sample piece (4 cm×4.5 cm) was cut out from the sheeting and immersed in 200 ml of a 0.1N hydrochloric acid aqueous solution at 60° C. for 2 hours to obtain an impregnated resin sheet having a pick-up (based on the weight of the resin before impregnation) of 174%.

The conductivity of the impregnated resin was found to be $3\times10^{-4}$ siemens/cm as measured by the use of a four-point probe resistivity meter (manufactured by Mitsubishi Petrochemical Company, Ltd.).

EXAMPLES 2 TO 13

Extruded sheetings having a thickness of 2.1 mm or 1.0 mm were prepared in the same manner as in Example 1, and a cut piece of each sheeting was immersed in an aqueous solution containing at least one of an organic acid, an inorganic acid, and an inorganic metal salt as shown in Table 1 to obtain a conductive resin sheet.

The pick-up and conductivity of the resulting impregnated resin sheet were determined in the same manner as in Example 1, and the results obtained are shown in Table 1.

EXAMPLES 14 AND 15

An ethylene copolymer containing 64% of an ethylene unit and 36% of a dimethylaminopropylacrylamide unit and having a number average molecular weight of 12,000 ($[\eta]=0.50$) and a melt index of 20 g/10 min at 125° C. was molded in a T-die extruder having a diameter of 20 mm at a resin temperature of 155° C. to prepare a continuous sheeting of 7.3 cm in wedth and 2.1 mm in thickness. A sample piece (4 cm×4.5 cm) was cut out of the sheeting and immersed in an inorganic acid aqueous solution as shown in Table 1. The pick-up and conductivity of the resulting sheet are shown in Table 1.

EXAMPLES 16 AND 17

An ethylene copolymer containing 61% of an ethylene unit, 25% of a dimethylaminopropylmethacrylamide unit, and 14% of a dimethylaminoethyl methacrylate unit and having a number average molecular weight of 24,200 ($[\eta]=0.78$) and a melt index of 8 g/10 min at 125° C. was extrusion molded in the same manner as in Example 1 to prepare a sheeting. The resulting sheeting was immersed in an inorganic acid aqueous solution as shown in Table 1 to obtain a conductive sheet. The pick-up and conductivity of the resulting impregnated sheet are shown in Table 1.

TABLE 1

| | Resin Sample | | | | Immersion Condition | | | | Result | |
|---|---|---|---|---|---|---|---|---|---|---|
| Example No. | Comonomer | Content (wt %) | $\overline{Mn}$ | Thickness (mm) | solution | Concentration | Temperature (°C.) | Time (hr) | Pick-up (wt %) | Conductivity (siemens/cm) |
| 1 | Dimethylaminopropylacrylamide | 43 | 31000 | 2.1 | hydrochloric acid | 0.1N | 60 | 2 | 174 (137)* | $3\times10^{-4}$ |
| 2 | Dimethylaminopropylacrylamide | " | " | " | hydrochloric acid ferric chloride | 0.1N 0.2 mol/l | " | " | 125 (98) | $1\times10^{-4}$ |
| 3 | Dimethylaminopropylacrylamide | " | " | " | hydrochloric acid | 0.1N | 25 | 24 | 147 (129) | $4\times10^{-4}$ |
| 4 | Dimethylaminopropylacrylamide | " | " | 1.0 | hydrochloric acid | " | " | 4 | 138 (131) | $4\times10^{-4}$ |
| 5 | Dimethylaminopropylacrylamide | " | " | 2.1 | nitric acid | 0.1N | 60 | 2 | 125 (95) | $2\times10^{-4}$ |
| 6 | Dimethylaminopropylacrylamide | " | " | " | sulfuric acid | 0.1N | 60 | 2 | 86 (71) | $3\times10^{-4}$ |
| 7 | Dimethylaminopropylacrylamide | " | " | 2.1 | " | 50% | " | " | 173 (102) | $2\times10^{-2}$ |
| 8 | Dimethylaminopropylacrylamide | " | " | " | " | 70% | " | " | 152 (84) | $5\times10^{-2}$ |
| 9 | Dimethylaminopropylacrylamide | " | " | 1.0 | " | 50% | " | 1 | 225 (135) | $2\times10^{-2}$ |
| 10 | Dimethylamino- | 43 | 31000 | 2.1 | phosphoric | 0.1N | 60 | 2 | 135 | $3\times10^{-4}$ |

TABLE 1-continued

| Example No. | Resin Sample Comonomer | Content (wt %) | $\overline{Mn}$ | Thickness (mm) | Immersion Condition solution | Concentration | Temperature (°C.) | Time (hr) | Result Pick-up (wt %) | Conductivity (siemens/cm) |
|---|---|---|---|---|---|---|---|---|---|---|
|  | propylacrylamide |  |  |  | acid |  |  |  | (110)* |  |
| 11 | Dimethylamino-propylacrylamide | " | " | " | acetic acid | 0.05N | " | 0.5 | 265 (257) | $7 \times 10^{-3}$ |
| 12 | Dimethylamino-propylacrylamide | " | " | " | acrylic acid | 0.05N | " | " | 236 (227) | $5 \times 10^{-3}$ |
| 13 | Dimethylamino-propylacrylamide | " | " | " | ferric sulfate | 2 mol/l | " | 4 | 70 (58) | $5 \times 10^{-4}$ |
| 14 | Dimethylamino-propylacrylamide | 36 | 12000 | " | hydrochloric acid | 0.1N | " | " | 69 (54) | $2 \times 10^{-4}$ |
| 15 | Dimethylamino-propylacrylamide | " | " | " | sulfuric acid | 50% | " | " | 115 (72) | $8 \times 10^{-2}$ |
| 16 | Dimethylamino-propylmeth-acrylamide/di-methylaminoethyl methacrylate | 20/15 | 24200 | " | hydrochloric acid | 0.1N | " | " | 55 (46) | $5 \times 10^{-4}$ |
| 17 | Dimethylamino-propylmeth-acrylamide/di-methylaminoethyl methacrylate | " | " | " | sulfuric acid | 50% | " | " | 103 (69) | $2 \times 10^{-2}$ |

Note:
*Values in the parentheses each indicates a degree of swelling (% by volume)

EXAMPLE 18

The same ethylene copolymer as used in Example 1 (ethylene unit content: 57%; dimethylaminopropylacrylamide unit content: 43%) was spun in a simplified spinning apparatus composed of a melt indexer combined with a winding machine to prepare a filament yarn having an average diameter of 60 μm. The filaments were gathered and heat-pressed at 75° C. to prepare a porous sheet having a density of 0.35 g/cm³ and a void of 62% by volume. The porous sheet was immersed in a 50% sulfuric acid aqueous solution at 25° C. for 30 minutes.

The resulting impregnated sheet was found to have absorbed in its resinous portion the 50% sulfuric acid aqueous solution in an amount of 2.2 times the weight of the resin before impregnation while stably retaining the 50% sulfuric acid aqueous solution in an amount of 2.3 times the weight of the resin before impregnation in its voids. The electrical conductivity of the impregnated sheet was $5 \times 10^{-1}$ siemens/cm.

COMPARATIVE EXAMPLES 1 TO 3

Each of the sample pieces as prepared in Examples 1, 14, and 16 was immersed in pure water at 60° C. for 2 hours. The resulting impregnated sheets were found to have a pick-up of 2.7%, 1.7%, and 1.5%, respectively, and a conductivity of $10^{-7}$ siemens/cm or less as measured by means of a four-point probe resistivity meter in each case or a conductivity of $8 \times 10^{-10}$, $6 \times 10^{-10}$, and $3 \times 10^{-10}$ siemens/cm, respectively, as measured by means of an ultra-megohm meter (manufactured by Toa Denpa Kogyo K.K.). These results are tabulated in Table 2 below.

TABLE 2

| Comparative Example No. | Resin Sample Comonomer | Content (wt %) | $\overline{Mn}$ | Thickness (mm) | Immersion Condition solution | Concentration | Temperature (°C.) | Time (hr) | Result Pick-up (wt %) | Conductivity* (siemens/cm) |
|---|---|---|---|---|---|---|---|---|---|---|
| 1 | Dimethylamino-propylacrylamide | 43 | 31000 | 2.1 | pure water | | 60 | 2 | 2.7 (2.2)** | $8 \times 10^{-10}$ |
| 2 | Dimethylamino-propylacrylamide | 36 | 12000 | " | " | | " | " | 1.7 (1.4) | $6 \times 10^{-10}$ |
| 3 | Dimethylamino-propyl meth-acrylamide/di-methylaminoethyl methacrylate | 20/15 | 24200 | " | " | | " | " | 1.5 (1.3) | $3 \times 10^{-10}$ |

Note:
*Measures by the use of a super insulation tester (manufactured by Toa Denpa Kogyo K. K.)
**Values in the parentheses each indicates a degree of swelling (% by volume)

As described above, the present invention provides an ionically conductive plastic molding which has excellent electrical conductivity and can be fabricated in any complicated shape, being free from various disadvantages attending the conventional conductive plastic moldings. The present invention further provides a process for producing such a conductive plastic molding, in which a resin molding material can be molded easily and at low cost.

While the invention has been described in detail and with reference to specific embodiments thereof, it will be apparent to one skilled in the art that various changes and modifications can be made therein without departing from the spirit and scope thereof.

What is claimed is:
1. A conductive plastic molding which is obtained by melt molding an ethylene copolymer comprising:
from 40 to 90% by weight of an ethylene unit, from 10 to 60% by weight of at least one dialkylaminoalkylacrylamide comonomer unit represented by formula (I)

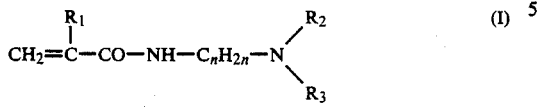

wherein
$R_1$ represents a hydrogen atom or a methyl group;
$R_2$ and $R_3$ each represents an alkyl group having from 1 to 4 carbon atoms; and
n represents an integer of from 2 to 5, and
up to 20% by weight of one or more ethylenically unsaturated comonomer units and having at least 10 parts by weight of an aqueous solution of at least one compound selected from the group consisting of an organic acid, an inorganic acid, and an inorganic metal salt into 100 parts by weight of the resulting metal molded
wherein
said organic acid is selected from the group consisting of formic acid, acetic acid, oxalic acid, tartaric acid, benzoic acid, lactic acid, acrylic acid, maleic acid, methanesulfonic acid, and benzenesulfonic acid;
said inorganic acid is selected from the group consisting of hydrochloric acid, sulfuric acid, nitric acid, phosphoric acid, pyrophosphoric acid, polyphosphoric acid, perchloric acid, hydrofluoric acid, hydrobromic acid, and hydroiodic acid; and
said inorganic metal salt is selected from the group consisting of ferrous chloride, ferric chloride, nickel chloride, ferrous sulfate, ferric sulfate, nickel sulfate, ferrous nitrate, ferric nitrate, and nickel nitrate.

2. A conductive plastic molding as claimed in claim 1, wherein the dialkylaminoalkylacrylamide comonomer is at least one member selected from dimethylaminopropylacrylamide, dimethylaminopropylmethacrylamide, dimethylaminoethylacrylamide, and dimethylaminoethylmethacrylamide.

3. A conductive plastic molding as claimed in claim 1, wherein the ethylenically unsaturated comonomer is at least one member selected from methyl acrylate, ethyl acrylate, methyl methacrylate, vinyl acetate, dimethylaminoethyl methacrylate, and dimethylaminoethyl acrylate.

4. A process for producing a conductive plastic molding which comprises the step of:
melt molding an ethylene copolymer comprising
from 40 to 90% by weight of an ethylene unit,
from 10 to 60% by weight of at least one dialkylaminoalkylacrylamide comonomer unit represented by formula (I)

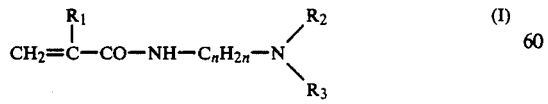

wherein
$R_1$ represents a hydrogen atom or a methyl group;
$R_2$ and $R_3$ each represents an alkyl group having from 1 to 4 carbon atoms; and
n represents an integer of from 2 to 5, and up to 20% by weight of one or more ethylenically unsaturated comonomer units and having at least 10 parts by weight of an aqueous solution of at least one compound selected from the group consisting of an organic acid, an inorganic acid, and an inorganic metal salt into 100 parts by weight of the resulting melt molded
wherein
said organic acid is selected from the group consisting of formic acid, acetic acid, oxalic acid, tartaric acid, benzoic acid, lactic acid, acrylic acid, maleic acid, methanesulfonic acid, and benzenesulfonic acid;
said inorganic acid is selected from the group consisting of hydrochloric acid, sulfuric acid, nitric acid, phosphoric acid, pyrophosphoric acid, polyphosphoric acid, perchloric acid, hydrofluoric acid, hydrobromic acid, and hydroiodic acid; and
said inorganic metal salt is selected from the group consisting of ferrous chloride, ferric chloride, nickel chloride, ferrous sulfate, ferric sulfate, nickel sulfate, ferrous nitrate, ferric nitrate, and nickel nitrate.

5. A process as claimed in claim 4, wherein the dialkylaminoalkylacrylamide comonomer is at least one member selected from dimethylaminopropylacrylamide, dimethylaminopropylmethacrylamide, dimethylaminoethylacrylamide, and dimethylaminoethylmethacrylamide.

6. A process as claimed in claim 4, wherein the ethylenically unsaturated comonomer is at least one member selected from methyl acrylate, ethyl acrylate, methyl methacrylate, vinyl acetate, dimethylaminoethyl methacrylate, and dimethylaminoethyl acrylate.

7. A conductive plastic molding which is obtained by melt molding an ethylene copolymer comprising:
from 40 to 90% by weight of an ethylene unit,
from 10 to 60% by weight of at least one dialkylaminoalkylacrylamide comonomer unit represented by formula (I)

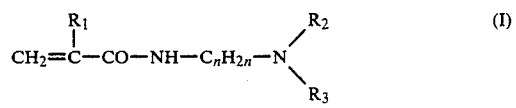

wherein
$R_1$ represents a hydrogen atom or a methyl group;
$R_2$ and $R_3$ each represents an alkyl group having from 1 to 4 carbon atoms; and
n represents an integer of from 2 to 5, and
up to 20% by weight of one or more ethylenically unsaturated comonomer units and having a number average molecular weight of from 5,000 to 50,000 and impregnating at least 10 parts by weight of an aqueous solution of an inorganic acid into 100 parts by weight of the resulting melt molded
wherein said inorganic acid is selected from the group consisting of hydrochloric acid, sulfuric acid, nitric acid, phosphoric acid, pyrophosphoric acid, polyphosphoric acid, perchloric acid, hydrofluoric acid, hydrobromic acid, and hydroiodic acid.

8. A process for producing a conductive plastic molding which comprises the steps of:
melt molding an ethylene copolymer comprising from 40 to 90% by weight of an ethylene unit,
from 10 to 60% by weight of at least one dialkylaminoalkylacrylamide comonomer unit represented by formula (I)

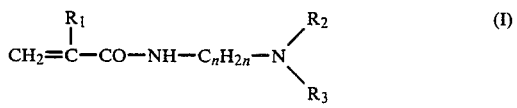

wherein
$R_1$ represents a hydrogen atom or a methyl group;
$R_2$ and $R_3$ each represents an alkyl group having from 1 to 4 carbon atoms; and
n represents an integer of from 2 to 5, and
up to 20% by weight of one or more ethylenically unsaturated comonomer units and having a number average molecular weight of from 5,000 to 50,000 and impregnating at least 10 parts by weight of an aqueous solution of an inorganic acid, into 100 parts by weight of the resulting melt molded
wherein
said inorganic acid is selected from the group consisting of hydrochloric acid, sulfuric acid, nitric acid, phosphoric acid, pyrophosphoric acid, polyphosphoric acid, perchloric acid, hydrofluoric acid, hydrobromic acid, and hydroiodic acid.

9. A conductive plastic molding as claimed in claim 7, wherein the inorganic acid is used together with an inorganic metal salt wherein said inorganic metal salt is selected from the group consisting of ferrous chloride, ferric chloride, nickel chloride, ferrous sulfate, ferric sulfate, nickel sulfate, ferrous nitrate, ferric nitrate, and nickel nitrate.

* * * * *